United States Patent [19]

Maeda et al.

[11] 4,363,051

[45] Dec. 7, 1982

[54] VIDEO TAPE RECORDER ARRANGED TO BE CONNECTED WITH A VIDEO CAMERA

[75] Inventors: Masaya Maeda; Noritsugu Hirata; Hiroyuki Takimoto, all of Yokohama, Japan

[73] Assignee: Canon Kabushiki Kaisha, Tokyo, Japan

[21] Appl. No.: 206,486

[22] Filed: Nov. 13, 1980

[30] Foreign Application Priority Data

Nov. 14, 1979 [JP] Japan .............................. 54-147254

[51] Int. Cl.³ ............................................. H04N 5/78
[52] U.S. Cl. .................................... 360/33.1; 358/335
[58] Field of Search .................. 360/14, 33, 55, 137; 358/4, 8, 127

[56] References Cited

U.S. PATENT DOCUMENTS

| | | | |
|---|---|---|---|
| 3,974,522 | 8/1976 | Fukatsu et al. | 360/14 |
| 4,116,078 | 9/1978 | Kitamura et al. | 360/137 X |
| 4,163,263 | 7/1979 | Rotter | 360/14 |
| 4,280,149 | 7/1981 | Bragas | 360/14 |

*Primary Examiner*—Stuart N. Hecker
*Assistant Examiner*—Donald McElheny, Jr.
*Attorney, Agent, or Firm*—Toren, McGeady and Stanger

[57] ABSTRACT

A video tape recorder allows pictures to be taken and recorded with a video camera connected to the recorder. The recorder has a push button which is activatable to stop recorder operation, and has a circuit for nullifying or defeating the operation of the stop push button. The nullifying circuit is controllable by the operation of the video camera connected to the recorder, and is arranged to nullify the operation of the stop push button at least when the video camera is performing a picture-taking operation.

11 Claims, 3 Drawing Figures

VIDEO TAPE RECORDER ARRANGED TO BE CONNECTED WITH A VIDEO CAMERA

BACKGROUND OF THE INVENTION

1. Field of the Invention

This invention relates to a video tape recorder, and more particularly to an improvement of the mode operation selection portion of a video tape recorder of the type which allows pictures to be taken and recorded with a video camera connected to the recorder.

2. Description of the Prior Art

During the past several years, the use of household video tape recorders has become quite popular. The size of these household video tape recorders has recently been reduced so as to make them portable. When such portable video tape recorders are combined with compact video cameras, portable video recording systems are then provided for picture taking and recording. Generally, when taking pictures with such a portable video recording system, the video recording button of the video tape recorder is first pushed to set the recorder into an image recording mode. After that, the tape in the recorder starts its travel when the camera is triggered. Video signals produced by the camera are then recorded on the tape. To stop the video recording operation, the tape in the recorder is prevented from travelling further by releasing the camera trigger.

A video tape recorder is not limited in its use such that it can only operate with a video camera, but it can also be used in combination with a conventional TV receiver for so-called on-air recording and/or for reproducing and displaying recorded images. Therefore, a video tape recorder is usually equipped with more than a button for bringing the recorder from an image recording or reproducing state to a pause. In the conventional video tape recorders, a stop button also is provided and can be operated as desired even when the recorder is connected with a video camera. Therefore, if this stop button is operated while the video camera is connected to the recorder, the recorder ceases to perform a video recording operation even though the camera is still in a trigger-on state and is performing a picture taking operation. Such being the arrangement of the conventional video tape recorders, if a part of the operator's body, such as an elbow, should inadvertently touch and push the stop button, or if the stop button should be pushed by mistake, video recording would terminate prematurely. A good recording situation thus might be lost, or the operator might sometimes happen to deceive himself believing that recording was being carried out while, in fact, it was not.

The probability of such erroneous operation is particularly great where the operating switches of the video tape recroder are not of so-called "piano key" construction which require a relatively large pressing force, but are so-called "feather-touch" type switches which can be operated with a relatively light touch.

SUMMARY OF THE INVENTION

The present invention is particularly suited to solve the above problems. It is an object of the invention to provide a video tape recorder which can be used together with a video camera, and which is arranged to eliminate the above inconveniences without in any way sacrificing its operating capabilities.

It is another object of the invention to provide a video tape recorder which enables a video camera to be connected thereto and which can be realized by modification of a portion of a conventional video tape recorder. The present video tape recorder is arranged such that, even if an operation stop member, such as a stop button, is mistakenly operated during a picture taking and video recording operation with a video camera, video recording is not interrupted by the mistakenly operated stop member.

In accordance with the invention, the above-stated objects are obtained by the provision of means for nullifying or defeating the operation of an operation stop member. The nullifying means is arranged to be controlled by a video camera which is connected to the video tape recorder. The nullifying means remains inoperative when no video camera is connected to the video tape recorder. However, the nullifying means operates to nullify the operation of the stop member at least when the connected video camera is in a picture taking state.

Specifically, the operation stop member can be, for example, a stop button arranged to actuate a driving circuit for a stopping solenoid. The nullifying means can be, for example, a controllable switching element inserted in the solenoid driving circuit. The switching element is controlled by a trigger switch of the video camera connected to the video tape recorder, and makes the solenoid driving circuit non-responsive to the operation of the stop button when the camera trigger switch is in a closed state.

With the arrangement of the present video tape recorder, which permits a video camera to be connected thereto, operation of the stop button is nullified when the connected video camera is in a picture taking mode and the video tape recorder simultaneously is in a video recording state. Therefore, even when the stop button is operated by mistake under such a condition, the video tape recorder never comes to a stop, but continues to perform its video recording operation.

These and further objects and features of the present invention will be apparent from the following detailed description when read in conjunction with the accompanying drawing.

DETAILED DESCRIPTION OF THE INVENTION

Figure 1:
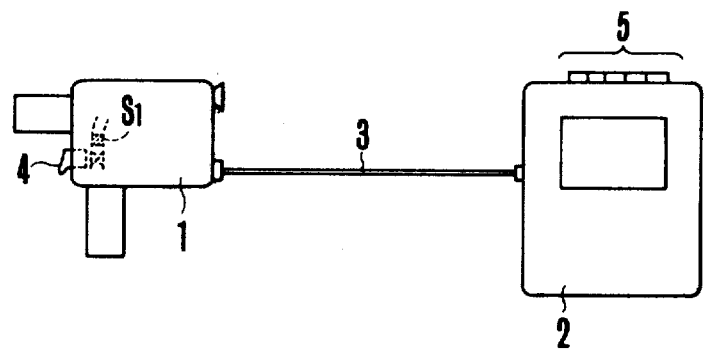
FIG. 1 is a schematic view showing an entire video tape recording system according to the invention, including a video camera connected to a video tape recorder.

FIG. 1 shows a video camera 1 equipped with a trigger switch S1. The switch S1 is closed by depressing a trigger button 4. Although not shown in the drawing, the video camera 1 is, as is well-known, further provided with image pickup means, and a video processing circuit which processes the output of the image pickup means and produces a video signal. FIG. 1 also shows a video tape recorder 2 which is connected to the video camera 1 through a cable 3. The video tape recorder 2 is arranged to record on a tape the video output of the video camera 1. For this purpose, the video tape recorder 2 is equipped with a mode operation selection portion or panel 5 for selecting various operating modes. The video tape recorder 2 can be, for example, a cassette type and, although not shown in the drawing, is provided with well-known video signal recording/reproducing means, recording and reproducing circuits and the like which together form a conventional video tape recorder.

Figure 2:
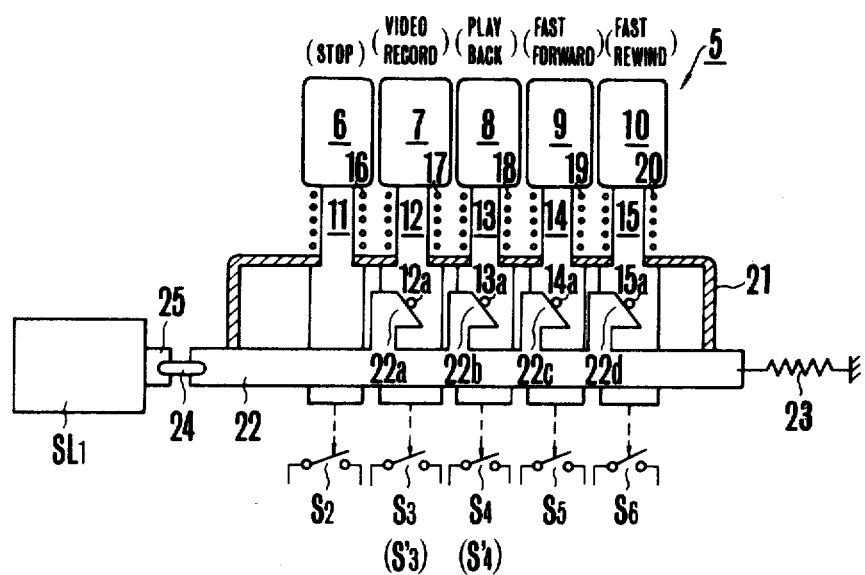
FIG. 2 is a schematic representation of details of the mode operation selection portion of the video tape recorder shown in FIG. 1.

Details of the selection portion 5 used in the video tape recorder 2 are shown in FIG. 2. Selection portion 5 includes a video recording mode button 7, a play-back mode button 8, a fast tape forwarding mode button 9, a fast tape rewinding mode button 10, and a stop button 6 which operates to stop each of the various modes selected by the mode buttons 7-10. The stop button 6, and the mode buttons 7-10 are attached respectively to free ends of levers 11,12,13, 14 and 15, supported by a carrying frame 21 so that the levers are slidable up and down, relative to the frame 21. Coil springs 16-20 are arranged to urge the buttons 6-10 upward, i.e., in a direction away from the recorder body.

The mode buttons 7-10 are each held at an inserted position by a latch lever 22. The latch lever 22 includes hook parts 22a, 22b, 22c and 22d which are arranged to permit pins 12a, 13a, 14a and 15a provided on the levers 12-15 to engage the hook parts in such positions as to require the mode buttons 7-10 to be depressed to the inserted position. Meanwhile, a spring 23, connected between the latch lever 22 and a stationary part of the recorder body urges the latch lever 22 rightward as viewed in FIG. 2, i.e. in a direction such that the pins 12a-15a are retained in engagement with the hook parts on the latch lever 22.

The hook parts 22a-22d each include a head portion which is formed with a tapered face. The pins 12a-15a each abut a different one of the tapered faces. When one of the mode buttons 7-10 is pushed down, its associated pin urges the latch lever 22 leftward, against the force of the spring 23, by way of the tapered face on which the pin abuts. When a mode button is completely depressed, its pin leaves the tapered face. Then the latch lever 22 is again urged rightward in FIG. 2 by the force of the spring 23 so that the corresponding hook part engages the pin associated with the depressed mode button and retains the mode button in the inserted position.

After a single mode button has been depressed, as described above, and another mode button is pushed down, the latch lever 22 is again urged to move leftward against the force of the spring 23. The previously depressed mode button is then released from the inserted position, and is urged upward by the force of its associated return spring, back to its extended position away from the recorder body.

A solenoid SL1 is arranged to release each of the mode buttons 7-10 from engagement with the latch lever 22 in the inserted position of the mode buttons. A plunger rod 25 of the solenoid SL1 is connected to the left end of the latch lever 22, as viewed in FIG. 2. When the solenoid SL1 is energized by a driving circuit, described later below, the plunger rod 25 is attracted against the force of a spring (not shown) provided within the solenoid SL1 for urging the plunger rod out from the solenoid body. The latch lever 22 then slides leftward against the force of the spring 23 to release any of the mode buttons which have been latched by the latch lever 22 in the inserted position. The mode button which is released from the inserted position is then brought back to its extended position by the force of its associated return spring.

FIG. 2 also shows a recording mode switch S3 for setting the recorder into a video recording mode, a play-back mode switch S4 for setting the recorder into a reproducing mode, a fast tape forwarding mode switch S5 for setting the recorder into a fast tape forwarding mode, and a fast tape rewinding switch S6 for setting the recorder into a fast tape rewinding mode. The switches are positioned to be closed by the ends of the levers 12-15 further from the mode buttons 7-10 when the mode buttons are depressed to the inserted position. The recorder is also provided with a stopping switch S2 for energizing the solenoid SL1. The stopping switch S2 is positioned to be closed by the end of the lever 11 further from the stop button 6 when the stop button is in the inserted position.

Figure 3:
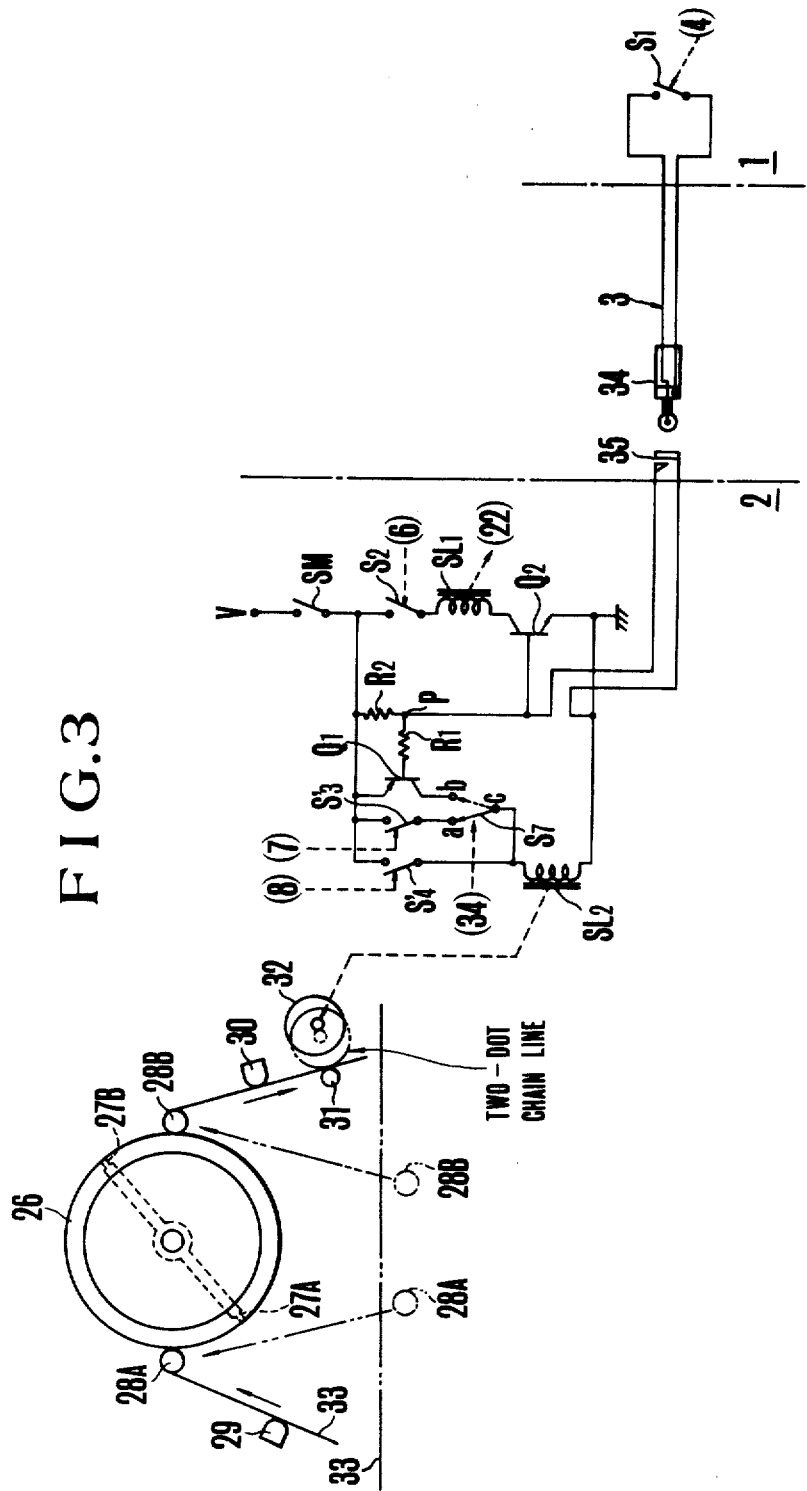
FIG. 3 is a schematic representation of the internal arrangement of the video tape recorder and the video camera shown in FIG. 1, showing an arrangement according to the invention including a stopping circuit associated with the mode operation selection portion, and a mechanism associated with the stopping circuit.

FIG. 3 shows a tape guide cylinder 26, a pair of video recording helical scanning rotary magnetic heads 27A and 27B which are disposed on the circumference of the cylinder 26 and are spaced apart by 180° from each other, conventional tape loading pins 28A and 28B which are arranged to bring a tape 33 pulled out from a cassette (not shown) around the cylinder 26 so that the tape covers about ½ of the circumference of the cylinder, a full-width erasing head 29, a control signal and audio signal recording/reproduce head 30, a tape driving capstan 31, and a pinch roller 32 which is arranged to urge the tape 33 against the capstan 31. The pinch roller 32 is arranged to be shifted, by an electro-magnetic mechanism including a solenoid SL2, between a separated position shown by a solid line in FIG. 3 and a pressure contact position shown by a two-dot chain line. Further, there is provided a change-over switch S7 which normally has its movable contact c connected to one of its fixed terminals a. However, when a plug 34, attached to the free end of the camera cable 3, is inserted into a jack 35 associated with the recorder 2, the change-over switch S7 has its contact c shifted from connecting with the terminal a to connecting with another fixed terminal b. Contact c is also directly connected to one end of solenoid SL2, while the other end of solenoid SL2 is grounded.

Pinch roller pressure switches S'3 and S'4 are arranged to be closed together with the mode switches S3 and S4, described above, when the video recording mode button 7 and the play-back mode button 8, shown in FIG. 2, are pushed down. One contact of switch S'3 is connected to the terminal a of the change-over switch S7, and one contact of the other switch S'4 is connected directly to the ungrounded end of solenoid SL2. Further, a PNP type of switching transistor Q1 has its collector connected to terminal b of the change-over switch S7, a resistor R1 is connected at one end to the base of transistor Q1, and an NPN type of switching transistor Q2 is arranged to serve as means for nullifying or defeating a video recording stopping operation by way of the stop button 6, as long as the video camera 1 is in a trigger-on state and the camera is connected to the recorder. The emitter of transistor Q2 is grounded, and the base of transistor Q2 is connected to one end of a resistor R2, which end is also connected to the other end of base resistor R1 of transistor Q1.

The stopping switch S2 and the solenoid SL1 are connected in series with each other and are connected to the collector of transistor Q2. The switches S2, S'3, S'4, the base resistor R2 of transistor Q2, and the emitter of transistor Q1 are connected to a power source (not shown) through a power source switch SM. A positive driving voltage V is supplied to these components from the power source when the switch SM is closed.

The jack 35, mentioned earlier, is connected between the circuit ground and a connection point P between the base resistor R1 of transistor Q1, and the base of the transistor Q2. The end of cable 3 remote from the plug 34 is connected to a trigger switch S1 associated with the camera 1. Therefore, with the plug 34 on the cable 3 inserted in the jack 35 associated with the recorder 2, the trigger switch S1 is connected in series between the connection point P and ground. Further, a signal supply line (not shown) in the cable 3 supplies a video output from the video processing circuit of the camera 1 to the video recording circuit (not shown) associated with the recorder 2. Therefore, with the cable 3 connected, the video processing circuit of the camera 1 is connected to the video recording circuit of the recorder 2.

When using the recorder 2 together with the camera 1, the plug 34 on the cable 3 is inserted in the recorder jack 35, and the movable contact of the switch S7 is shifted from terminal a to terminal b. Under this condition, when the recording mode button 7 is pushed down after the power source switch SM is closed, switches S3 and S'3 are closed. With the switch S3 closed, power is supplied to a video recording circuit (not shown). Meanwhile, a head driving motor (not shown) and another motor (also not shown) provided for driving the capstan are operated. The video recording heads 27A and 27B, and the capstan 31 thus are rotated. In addition, the tape loading mechanism (not shown) is actuated to move the tape loading pins 28A and 28B from their pre-loading positions, indicated by two-dot chain lines, to their operating positions, indicated by solid lines. The tape 33 is thereby pulled out from within the tape cassette (not shown). Accordingly, the cylinder 26, erasing head 29, and the control signal and audio signal head 30 are in contact with the tape. The recorder 2 is now in a stand-by condition for video recording. Under this condition, when the camera trigger button 4 is operated, the trigger switch S1 is closed to turn on transistor Q1 associated with the recorder 2. Solenoid SL2 is energized to shift the pinch roller 32 from the separated position (shown by the solid line) to the pressure contact position (shown by the two-dot chain line). This causes the tape 33 to begin its travel in the direction of the arrow shown in FIG. 3.

Meanwhile, a picture taking start switch (not shown) associated with the camera 1 is closed concurrently with the trigger switch S1 when the trigger button 4 on the camera is operated. With this start switch closed, the image pick-up means and the video processing circuit of the camera are energized so that a video signal is produced by the video processing circuit. The video signal is supplied to the video recording circuit of the recorder 2 through the signal supply line included in the cable 3. The output of the video recording circuit is then recorded by a well-known process through the video recording heads 27A and 27B onto the tape 33 while the tape is wrapped halfway around the circumference of the cylinder 26.

In this case, when the trigger button 4 is operated to close the trigger switch S1 associated with the camera, the base of the transistor Q2 associated with the recorder 2 drops to ground potential. Accordingly, while the camera 1 is in a trigger-on state, transistor Q2 turns off, even if the supply voltage V is supplied to the solenoid SL1 with stopping switch S2 closed by way of the stop button 6. Accordingly, any video recording stopping operation initiated by pushing the stop button 6 is nullified, as long as the camera 1 is in a trigger-on state. Therefore, the recorder 2 continues in its video recording operation, even if the stopping switch 2 is closed by depressing the stop button, so long as the camera remains in its trigger-on state.

When the trigger switch S1 is opened by releasing the trigger button on the camera 1, the picture taking operation of the camera 1 is terminated and, at the same time, transistor Q1 associated with the recorder 2 is turned off to cut off the supply of power to the solenoid SL2. A spring or the like (not shown) shifts the pinch roller 32 from the pressure contact position to the separated position. This causes the tape 33 to come to a stop.

Further, when the trigger switch S1 associated with the camera 1 is opened, transistor Q2 then has a predetermined bias voltage applied to its base through resistor R2. Therefore, when the stop button 6 is depressed to close the stopping switch S2 under this condition, transistor Q2 is turned on to energize the solenoid SL1. The video recording mode button 7, which was in the inserted position, is released from engagement with the latch lever 22. Then, the video recording mode button 7 is restored to its extended position by the force of the spring 17. At this time, the switches S3 and S'3 are opened, and the entire recorder 2 ceases to operate. Therefore, it is only when the camera 1 is in a trigger-off state that a video recording stopping operation, carried out by pushing down the stop button 6, becomes effective to stop the recorder from operating.

When the plug 34 on the cable 3 is removed from the jack 35 of the recorder 2, the switch S7 is connected to the terminal a. In this instance, solenoid SL2 is energized by closing of the switch S'3 in response to a depression of the video recording mode button 7. Therefore, the recorder does not merely remain in a stand-by state for video recording, i.e., in a state of maintaining the tape stationary after the tape loading process is completed, as in the above case where the plug 34 was inserted in the jack 35. The recorder is capable of starting a so-called on-air video recording immediately after the completion of a tape loading process. It goes without saying that, for such an on-air video recording, the operation of the recorder can be stopped as desired by pushing down the stop button 6.

Further, in the embodiment of FIG. 3, the pinch roller pressure switch S'4, which is to be closed together with the play-back mode switch S4 (shown in FIG. 2) by pushing down on the play-back mode button 8, is directly connected to the solenoid SL2 and is not connected through the change-over switch S7. This arrangement is made with the intention of permitting monitoring of reproduced images with an electronic viewfinder, in cases where such is used as the viewfinder for the video camera 1.

While specific embodiments of the invention have been shown and described in detail to illustrate the application of the inventive principles, it will be understood that the invention may be embodied otherwise without departing from such principles.

What is claimed is:

1. A video tape recorder which allows a video camera having a coupling device to be connected to the recorder, comprising:
- a coupling part for electrically connecting the video camera to the video tape recorder when the coupling device of the video camera is attached to said coupling part;
- stopping operation means for bringing the video tape recorder to a stop condition when the recorder is in a video recording state; and
- means coupled to said stopping operation means for nullifying the operation of said operating means, said nullifying means being arranged to be controlled by the video camera connected to said coupling part and to nullify the operation of said stopping operation means at least during a picture taking operation by the video camera when the video camera is connected to said coupling part.

2. A video tape recorder according to claim 1, wherein the video camera which is connected to said coupling part includes a trigger switch arranged to be in a closed state for a picture taking operation, and said nullifying means is arranged to nullify the operation of said stopping operation means when said trigger switch is in the closed state.

3. A video tape recorder according to claim 2, comprising:
- a stopping solenoid which is arranged to stop operation of the recorder when the recorder is in one of a number of operating modes including a recording mode;
- a driving circuit for driving said stopping solenoid in response to the operation of said stopping operation means; and
- said nullifying means includes a switching element inserted in said driving circuit, said switching element being arranged to render said driving circuit inoperative when said trigger switch of the video camera is in the closed state.

4. A video tape recorder which allows a video camera having a coupling device to be connected to the recorder, comprising:
- a coupling part for electrically connecting the video camera to the video tape recorder when the coupling device of the video camera is attached to said coupling part;
- video recording mode operation means operative to select a video recording mode for the video tape recorder; video recording mode setting means responsive to said video recording mode operation means for rendering the video tape recorder into the video recording mode, said video recording mode setting means including tape travel means which allows a magnetic tape to travel, and a tape travel driving circuit for driving said tape travel means, said tape travel driving circuit being shiftable between a first state wherein said tape travel driving circuit drives said tape travel means in response to said video recording mode operation means to allow the magnetic tape to travel when the video camera is not connected to said coupling part, and a second state wherein said tape travel driving circuit is controlled by the video camera and drives said tape travel means to allow the magnetic tape to travel at least when the video camera is in a picture taking state when the video camera is connected to said coupling part;
- stopping operation means for bringing the video tape recorder to a stop condition when the recorder is in a video recording state and said stopping operation means is operated; and
- means coupled to said stopping operation means for nullifying the operation of said stopping operation means, said nullifying means being arranged to be controlled by the video camera connected to said coupling part and to nullify the operation of said stopping operation means at least during a picture taking operation by the video camera when the video camera is connected to said coupling part.

5. A video tape recorder according to claim 4, wherein the video camera which is connected to said coupling part includes a trigger switch arranged to be in a closed state for a picture taking operation, and said nullifying means operates to nullify the operation of said stopping operation means when said trigger switch is in the closed state.

6. A video tape recorder according to claim 5, wherein said tape travel driving circuit includes a change-over switch which is arranged to be switched over from a first connection state to a second connection state by the camera coupling device when the camera coupling device is attached to said coupling part, wherein said tape travel driving circuit is actuated in response to said video recording mode operation means to allow the magnetic tape to travel by driving said tape travel means when said change-over switch is in the first connection state, and said tape travel driving circuit is actuated by closing said trigger switch of the video camera to allow the magnetic tape to travel by driving said tape travel means when said change-over switch is in the second connection state.

7. A video tape recorder according to claim 6, comprising:
- a capstan for moving the magnetic tape;
- a pinch roller associated with said capstan for causing the magnetic tape to travel;
- a solenoid for bringing said pinch roller into pressure contact with the tape against said capstan; and
- said tape travel driving circuit is arranged to energize said solenoid in response to said video recording mode operation means when said change-over switch is in the first connection state and to energize said solenoid in response to closing of said trigger switch of the video camera when said change-over switch is in the second connection state.

8. A video tape recorder according to claim 7, comprising:
- a stopping solenoid which is arranged to bring the video tape recorder to a stop condition when the recorder is in one of a number of operating modes including a recording mode;
- a solenoid driving circuit for driving said solenoid when said stopping operation means is operated; and
- said nullifying means includes a switching element inserted in said solenoid driving circuit provided for driving said stopping solenoid, said switching element being arranged to render said solenoid driving circuit inoperative when said trigger switch of the video camera is in the closed state.

9. A video tape recorder according to claim 8, comprising:
- a number of operation mode buttons including a video recording mode operation button;

lock means for selectively locking one of said number of operation mode buttons in an operating position;

said video recording mode operation means includes said video recording mode operation button which is arranged to be locked in an operating position by said lock means when said video recording mode operation button is operated; and said stopping solenoid is arranged to release said video recording mode operation button from being locked by said lock means.

10. A video tape recorder which allows a video camera to be connected to the recorder, comprising:

a connector for connecting the video camera to the video tape recorder;

a video recording mode operation button movable between a rest position and an operating position for setting the video tape recorder into a video recording mode, said video recording mode operation button being arranged to be locked in the operating position;

unlocking means for releasing said video recording mode operation button from a locked condition in the operating position and for restoring said video recording mode operation button to the rest position;

a solenoid arranged to actuate said locking means;

a solenoid driving circuit arranged to drive said solenoid;

a stopping operation button arranged to bring the video tape recorder to a stop condition when the tape recorder is operating and said stopping operation button is operated;

a stopping switch responsive to said stopping operation button, said stopping switch being arranged to be closed when said stopping operation button is operated, and to actuate said solenoid driving circuit when said stopping switch is closed by the operation of said stopping operation button; and a controllable switching element inserted in said solenoid driving circuit, said switching element being arranged to be controlled by the video camera when the video camera is connected to said connector, and to render said solenoid driving circuit inoperative while the video camera is in a picture taking state, regardless of the operation of said stopping operation button to close said stopping switch while the video camera remains in the picture taking state.

11. A video tape recorder which allows a video camera to be connected to the recorder, comprising:

a connector for connecting the video camera to the video tape recorder;

mode setting operation buttons including at least a video recording mode operation button, said mode setting operation buttons being arranged to be operated for setting the video tape recorder in one of a number of operating modes including a video recording mode and a play-back mode, said mode setting operation buttons being arranged to be locked in an operating position when said mode setting operation buttons are operated;

unlocking means for releasing said mode setting operation buttons from the locked operating position;

a solenoid arranged to actuate said unlocking means;

a solenoid driving circuit arranged to drive said solenoid;

a capstan for moving a magnetic tape;

a pinch roller associated with said capstan for causing the magnetic tape to travel;

video recording mode setting means arranged to be driven in response to operation of said video recording mode operation button to set the video tape recorder into a video recording state, said video recording mode setting means including a pinch roller driving circuit which is provided with a change-over switch, said change-over switch being arranged to be shifted from a first connection state to a second connection state when the video camera is connected to said connector, wherein said pinch roller driving circuit is arranged to be actuated in response to operation of said video recording mode operation means to bring said pinch roller into pressure contact with the magnetic tape against said capstan when said change-over switch is in the first connection state, and said pinch roller driving circuit is actuated in response to a picture taking operation of the video camera connected to said connector to bring said pinch roller into pressure contact with the tape against said capstan when said change-over switch is in the second connection state;

a stop operation button arranged to bring the video tape recorder to a stop condition after the video tape recorder is set into an operating mode and said stop operation button is operated;

a stopping switch interlocked with said stop operation button, said stopping switch being arranged to be closed to actuate said solenoid driving circuit when said stop operation button is operated; and a controllable switching element inserted in said solenoid driving circuit, said switching element being arranged to be controlled by the video camera when the video camera is connected to said connector and to render said solenoid driving circuit inoperative while the video camera is in a picture taking state, regardless of the operation of said stop operation button to close said stopping switch while the camera remains in the picture taking state.

* * * * *